Figure 1:
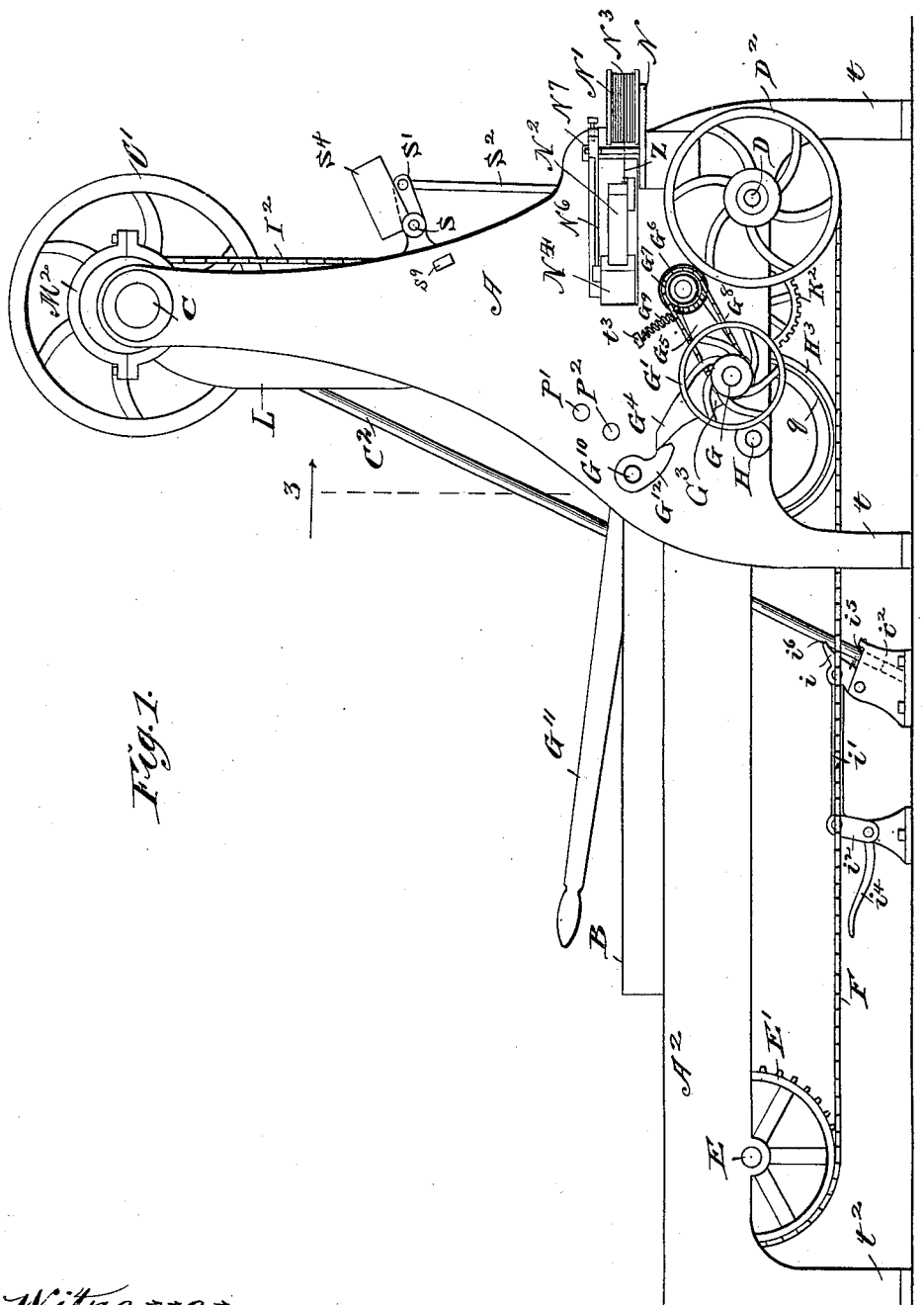

No. 614,348. Patented Nov. 15, 1898.
F. P. ROSBACK.
MACHINE FOR MAKING BOX BLANKS.
(Application filed June 20, 1898.)
(No Model.) 9 Sheets—Sheet 1.

Witnesses,

Inventor,
Frederick P. Rosback,
By Dyrenforth & Dyrenforth,
Attys.

No. 614,348. Patented Nov. 15, 1898.
F. P. ROSBACK.
MACHINE FOR MAKING BOX BLANKS.
(Application filed June 20, 1898.)
(No Model.) 9 Sheets—Sheet 2.

Witnesses,
Inventor,
Frederick P. Rosback,
By Dyrenforth & Dyrenforth,
Attys.

No. 614,348. Patented Nov. 15, 1898.
F. P. ROSBACK.
MACHINE FOR MAKING BOX BLANKS.
(Application filed June 20, 1898.)
(No Model.) 9 Sheets—Sheet 3.

Witnesses, Inventor,
Frederick P. Rosback,
By Dyrenforth & Dyrenforth,
Attys.

No. 614,348. Patented Nov. 15, 1898.
F. P. ROSBACK.
MACHINE FOR MAKING BOX BLANKS.
(Application filed June 20, 1898.)

(No Model.) 9 Sheets—Sheet 4.

Witnesses: Inventor,
Frederick P. Rosback,
By Dyrenforth & Dyrenforth,
Att'ys.

No. 614,348. Patented Nov. 15, 1898.
F. P. ROSBACK.
MACHINE FOR MAKING BOX BLANKS.
(Application filed June 20, 1898.)
(No Model.) 9 Sheets—Sheet 5.
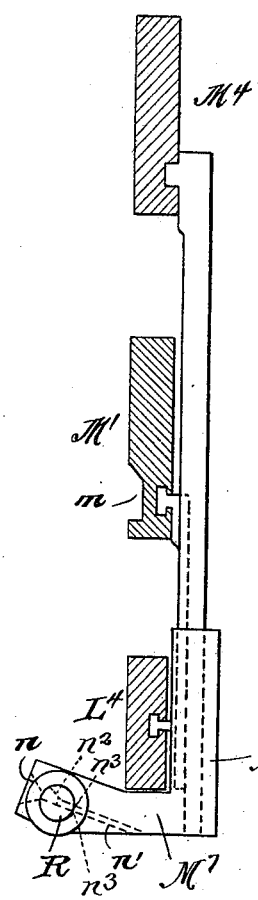
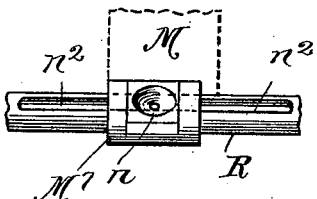
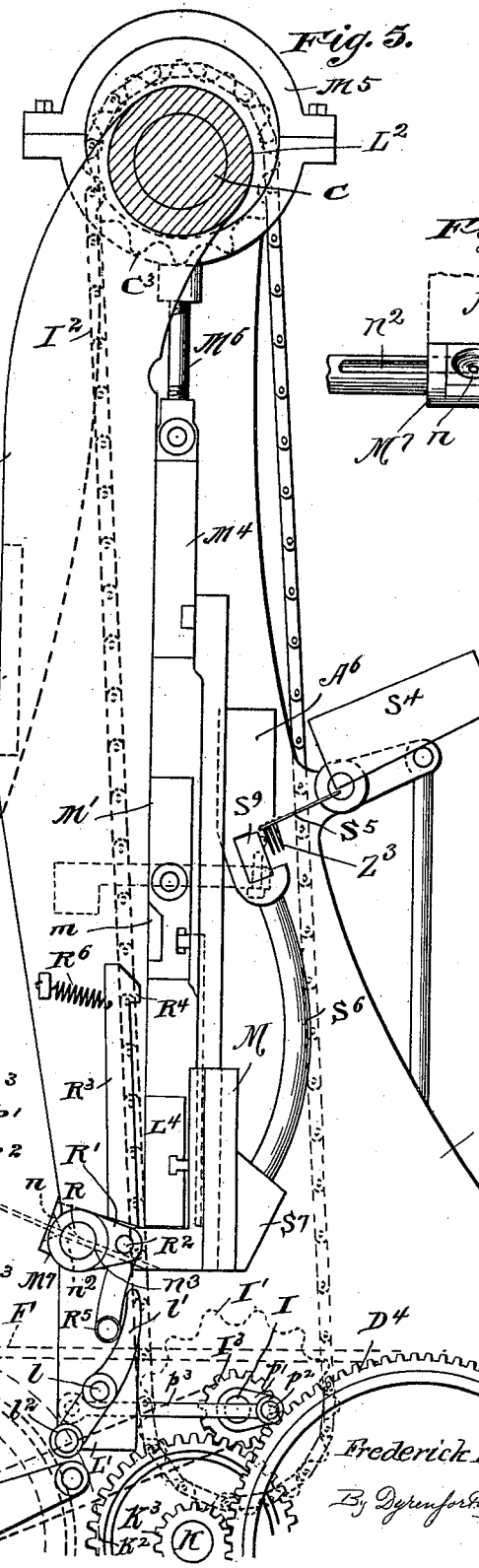
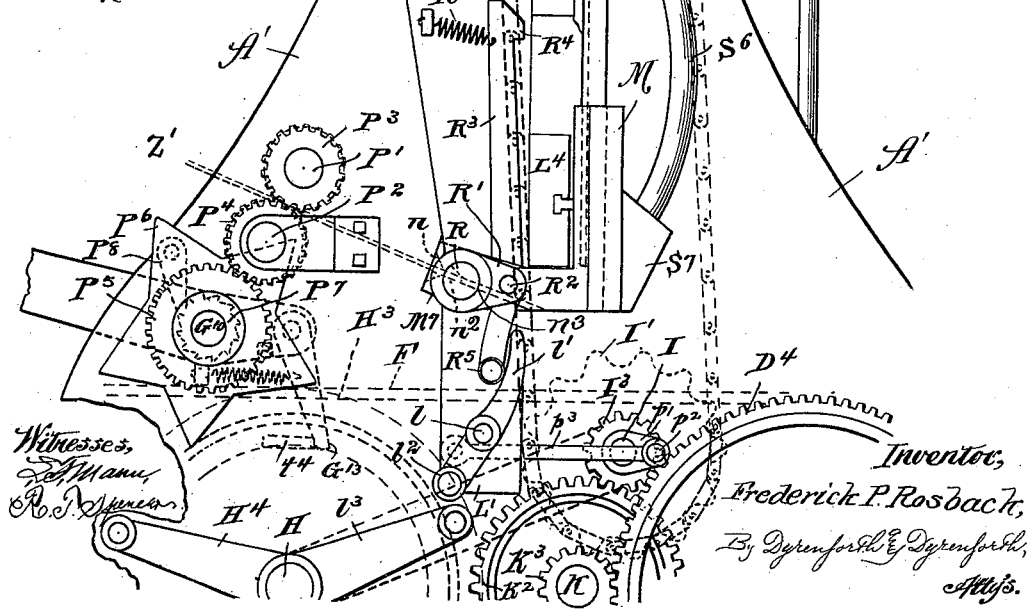
Inventor: Frederick P. Rosback,
By Dyrenforth & Dyrenforth,
Attys.

No. 614,348. Patented Nov. 15, 1898.
F. P. ROSBACK.
MACHINE FOR MAKING BOX BLANKS.
(Application filed June 20, 1898.)
(No Model.) 9 Sheets—Sheet 6.
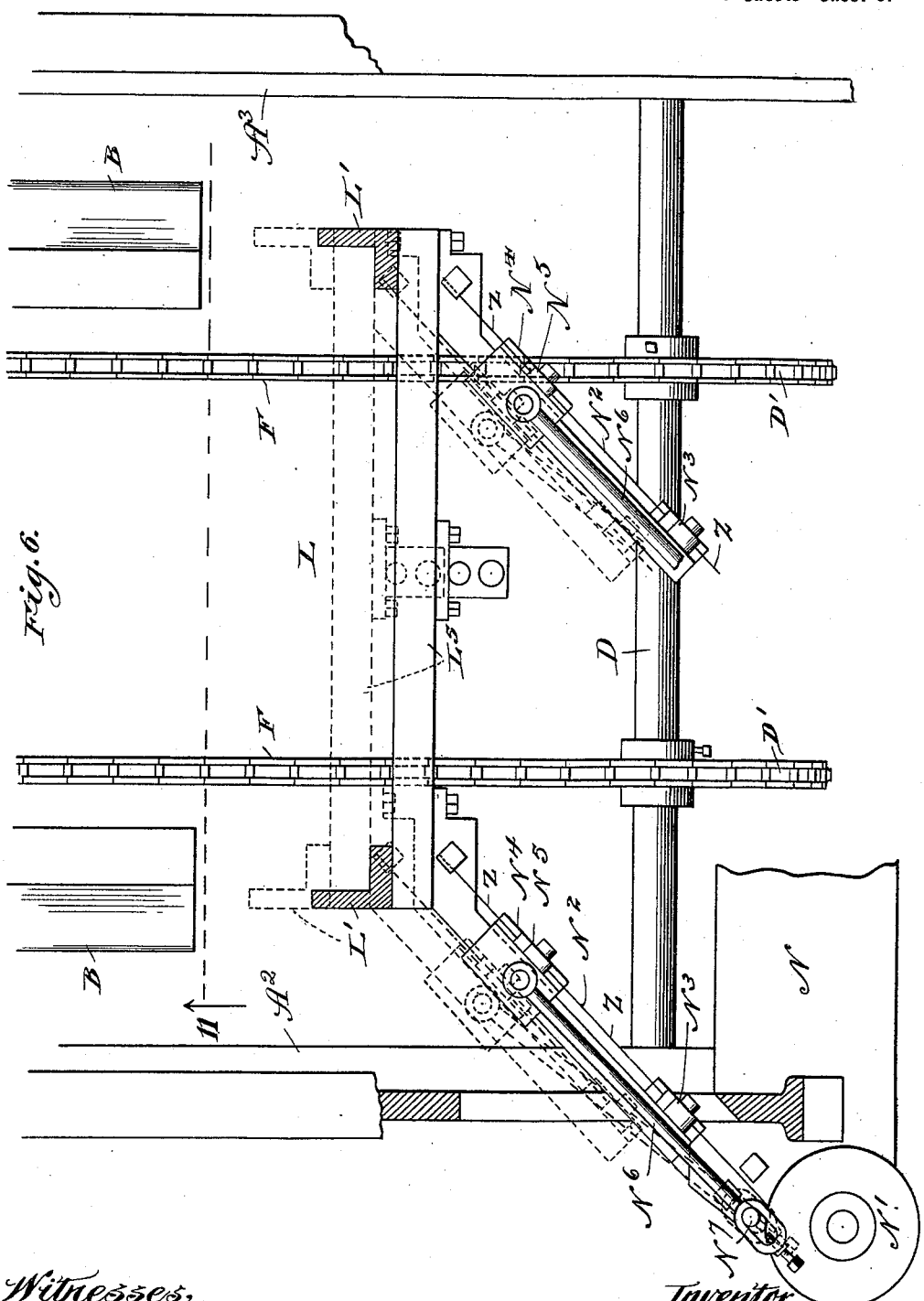

No. 614,348. Patented Nov. 15, 1898.
F. P. ROSBACK.
MACHINE FOR MAKING BOX BLANKS.
(Application filed June 20, 1898.)
(No Model.) 9 Sheets—Sheet 7.
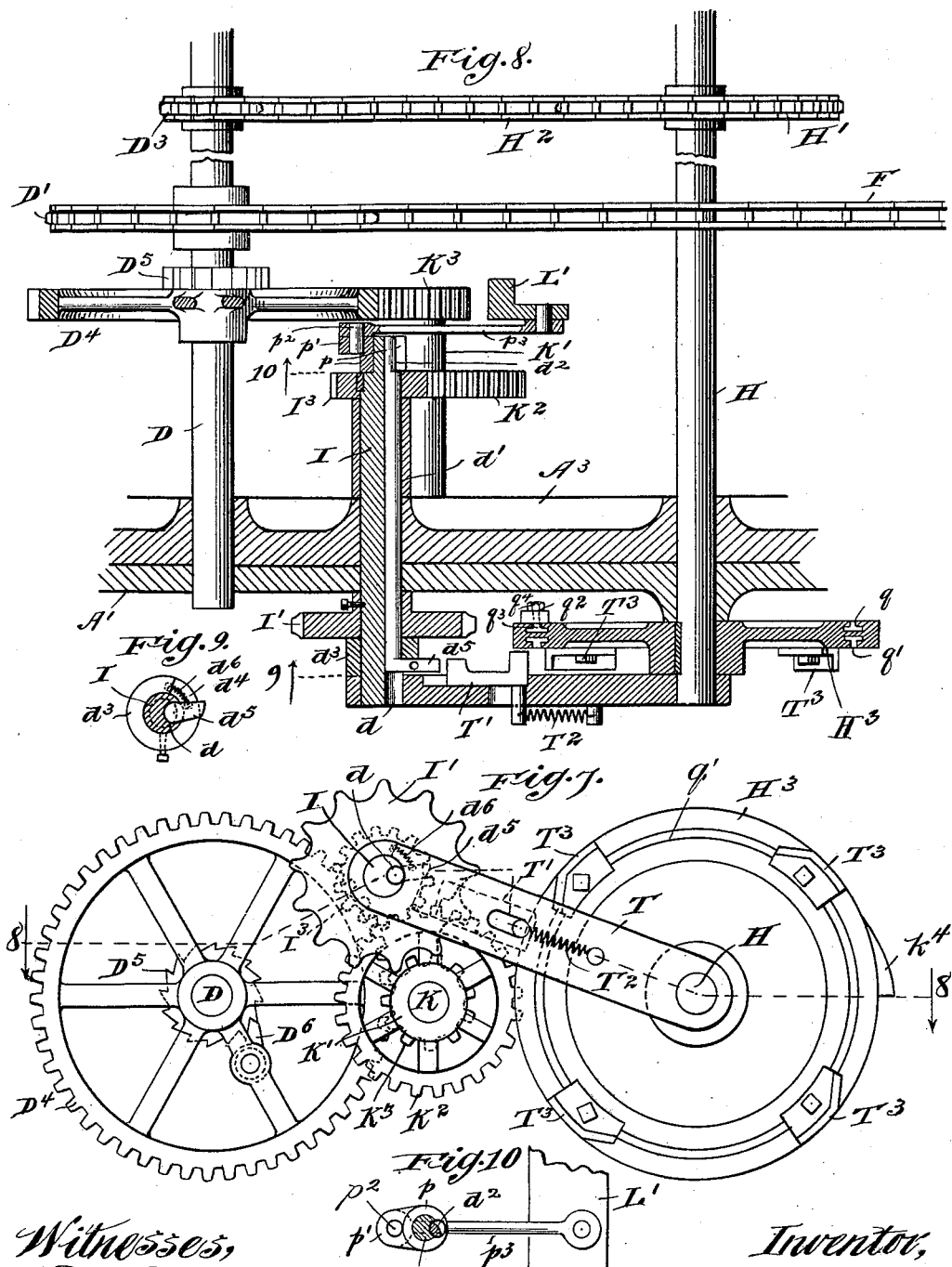

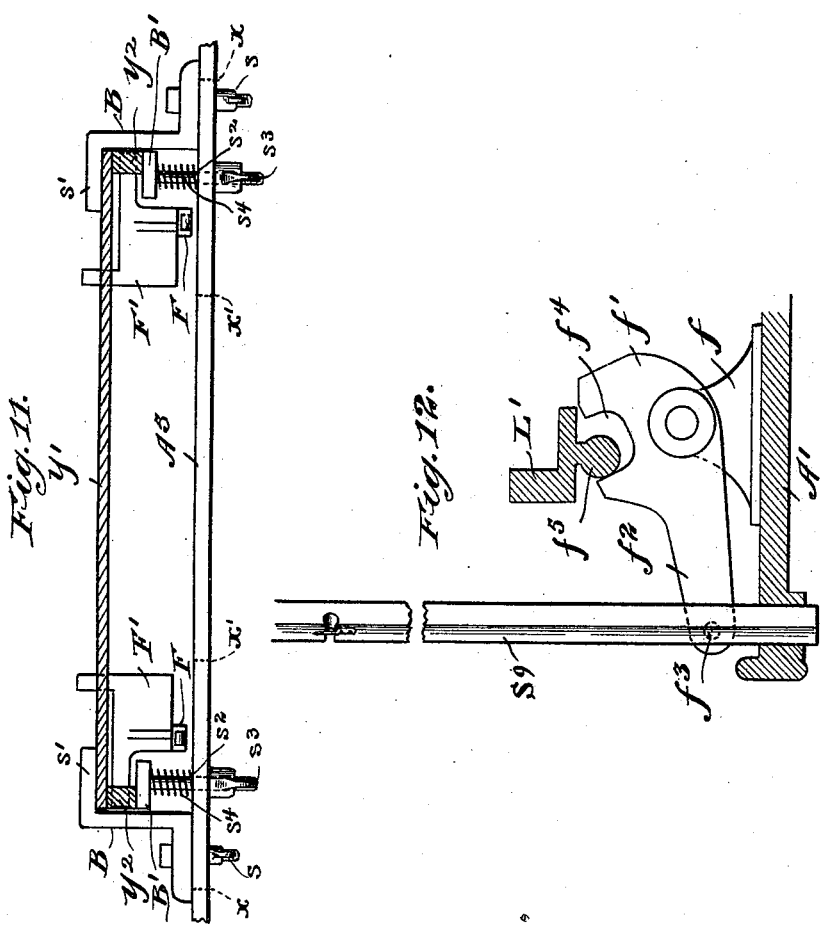

No. 614,348. Patented Nov. 15, 1898.
F. P. ROSBACK.
MACHINE FOR MAKING BOX BLANKS.
(Application filed June 20, 1898.)
(No Model.) 9 Sheets—Sheet 9.
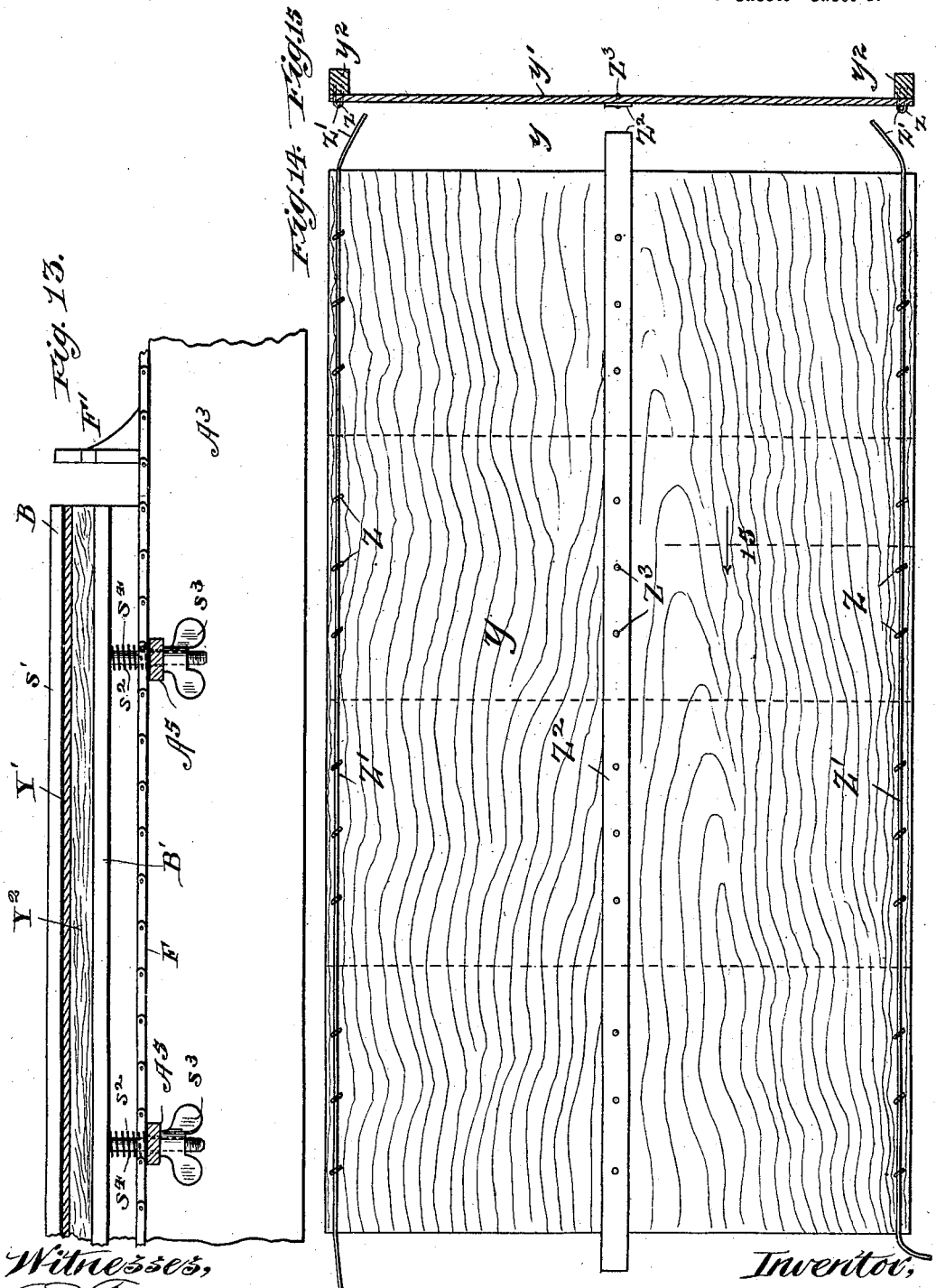
Witnesses,
Inventor,
Frederick P. Rosback,
By Dyrenforth & Dyrenforth,
Attys.

UNITED STATES PATENT OFFICE.

FREDERICK P. ROSBACK, OF CHICAGO, ILLINOIS, ASSIGNOR TO WILLIAM P. HEALY, OF SAME PLACE.

MACHINE FOR MAKING BOX-BLANKS.

SPECIFICATION forming part of Letters Patent No. 614,348, dated November 15, 1898.

Application filed June 20, 1898. Serial No. 683,975. (No model.)

*To all whom it may concern:*

Be it known that I, FREDERICK P. ROSBACK, a citizen of the United States, residing at Chicago, in the county of Cook and State of Illinois, have invented a new and useful Improvement in Machines for Making Box-Blanks, of which the following is a specification.

This invention relates to improvements in machines for making blanks for boxes, the blanks consisting each of a sheet of lumber or the like provided on one side with reinforcing-cleats and at its opposite side with strengthening wires or bands, the sheet and cleats being secured together by means of staples, nails, or the like, which also pass over or through strengthening wires or bands to hold them in place. Each blank is of a length to make four sides of a box, the cleats and sheet being cut away or step-mitered at the proper points to permit folding of the blank. In Patent No. 608,796, granted August 9, 1898, I have shown, described, and claimed a machine for making box-blanks, many of the details of the present machine being substantially the same as those in the machine forming the subject of the said patent. The difference between the present machine and the said former machine lies mainly in the fact that while in the former machine the blank material was fed intermittingly through the machine, alternating with the action of the staple-drivers or tacking devices, in the present machine the blank material moves steadily instead of intermittingly through the machine, the staple-drivers or tacking devices being mounted upon an oscillating or swinging support, which while the devices are performing the tacking operation moves with the blank material. The blank shown in the said pending application is formed of a sheet with cleats at opposite edges and three strengthening-wires, one at each of the cleats and one intermediate thereof, all the strengthening-wires being fastened in place by means of staples. The present machine may be provided with three staple forming and driving devices, the same as the other machine, or it may be provided with means for feeding one or more bands or flat strips of metal or other suitable material in place of the strengthening-wires and fastening them in place with nails instead of staples. Thus for purposes of illustration the present machine is shown provided with means for feeding strengthening-wires and making and driving staples at opposite edges of the blank and means for feeding a wide band along the central line of the blank and fastening it in place with nails clenched on the under side of the blank. For the reason that the present machine, as before stated, involves a number of details shown, described, and claimed in the said former patent only so much of the mechanism is herein shown as is thought necessary to illustrate an operative machine without setting forth details, which, owing to the said patent, cannot be claimed in the present case.

Figure 2:
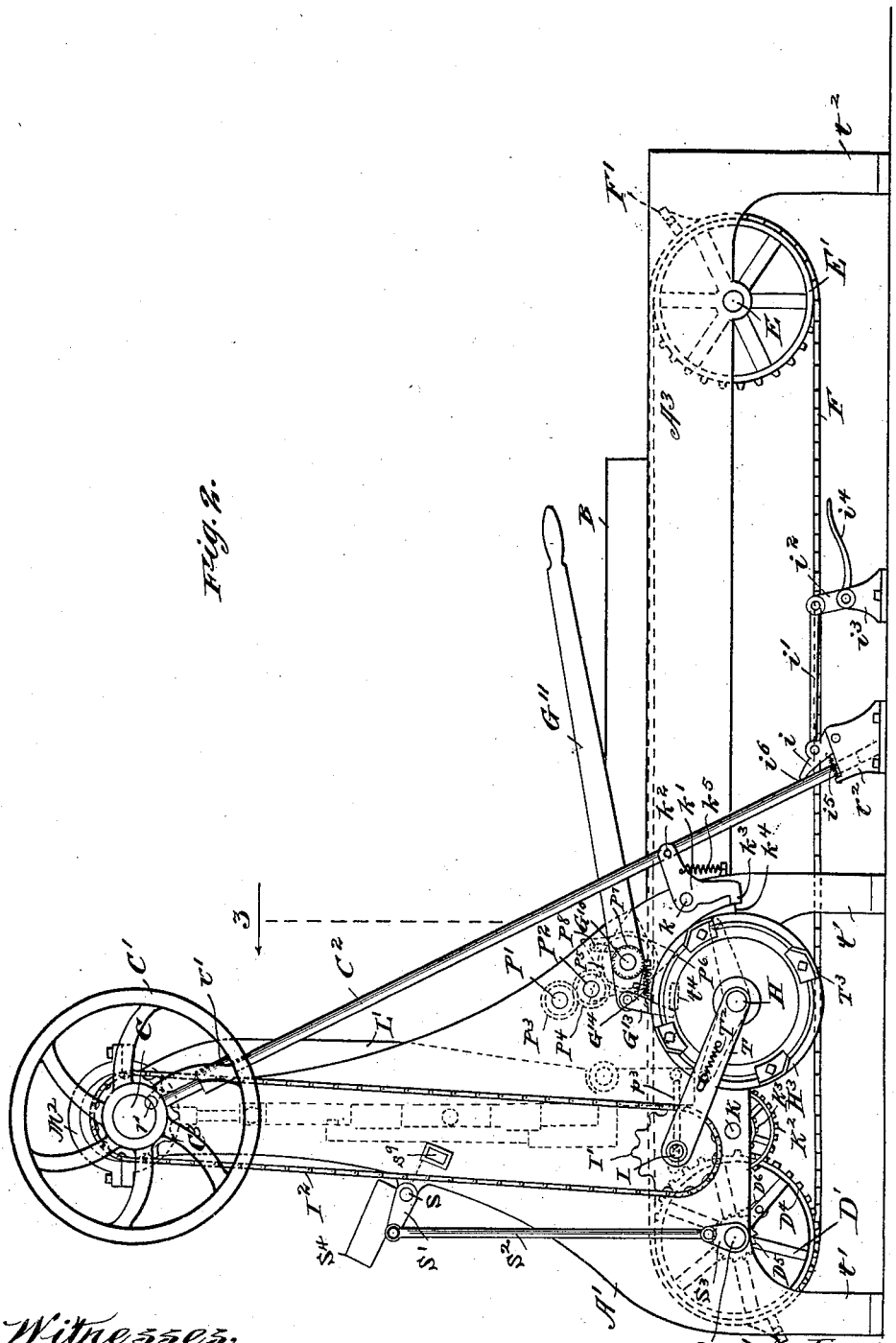
Figure 3:
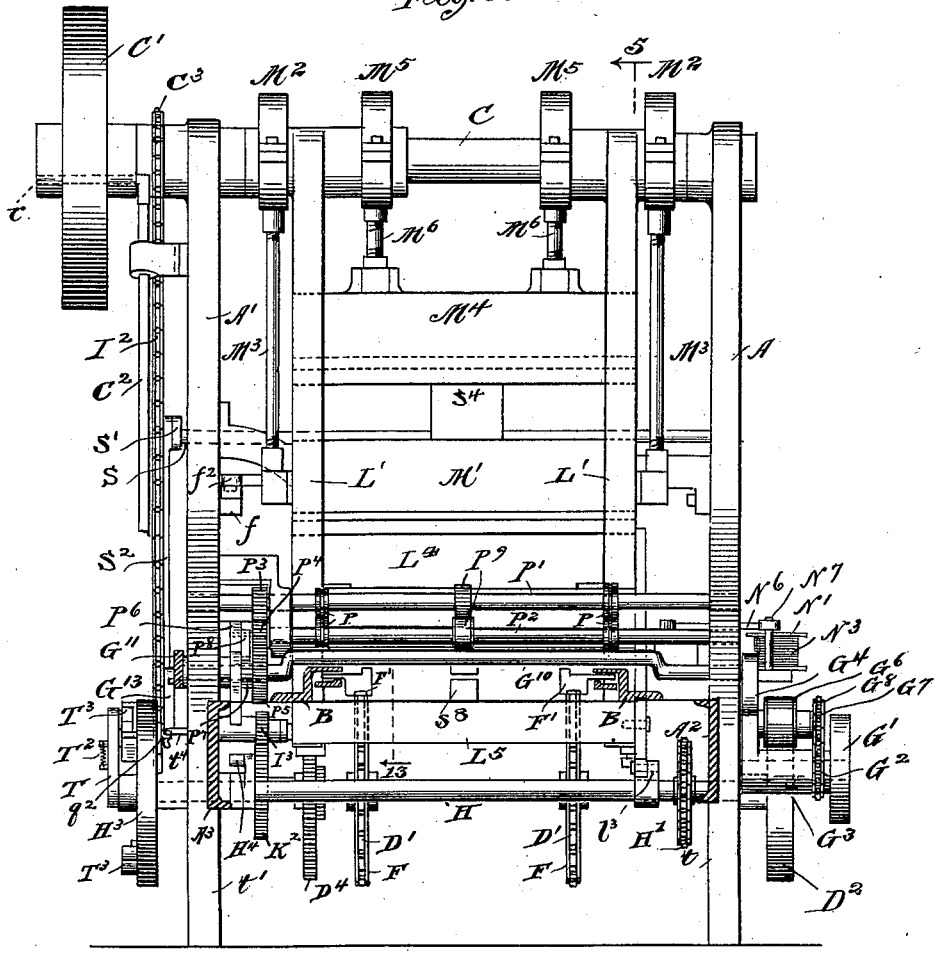
Figure 4:
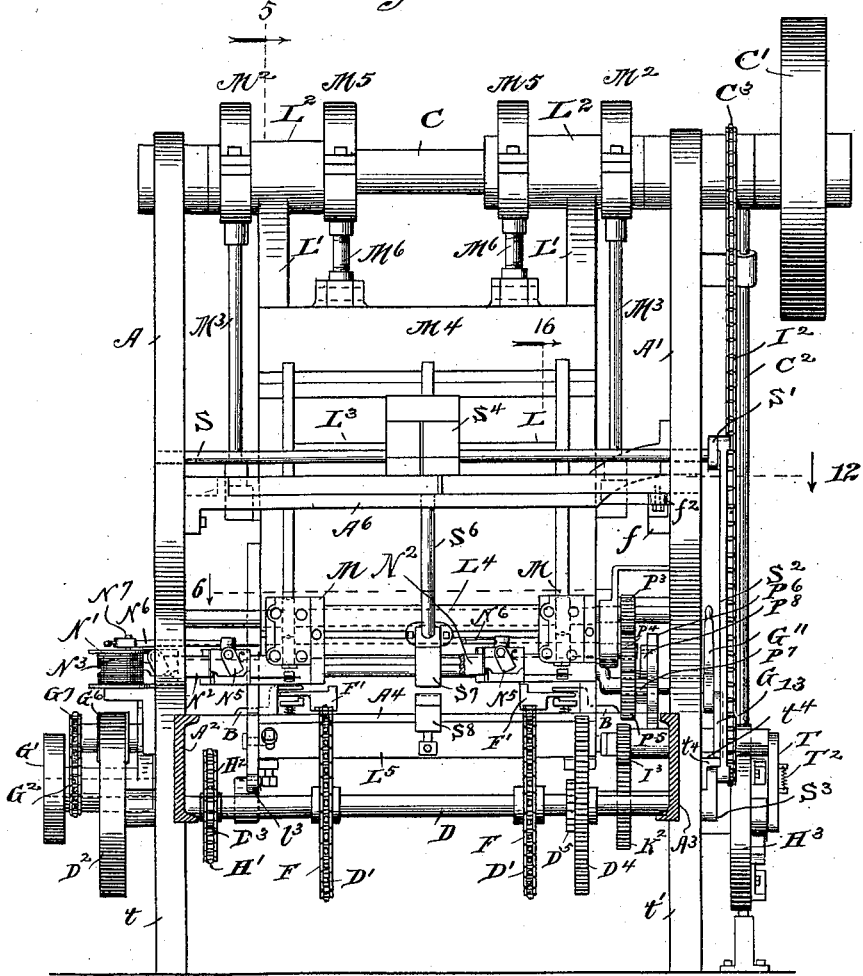

Referring to the drawings, Figure 1 is a view in elevation of the right-hand side of the machine; Fig. 2, a view in elevation of the left-hand side of the machine, certain features hidden by the frame being indicated by dotted lines; Fig. 3, a cross-section of the machine with the tacking devices removed, taken on line 3 of Fig. 1, corresponding with line 3 of Fig. 2, and viewed as indicated by the arrows; Fig. 4, a rear end elevation with a part broken away and with the end brace-bar removed and the side bars at the rear end in section; Fig. 5, an enlarged broken section taken on line 5 of Fig. 3, corresponding with line 5 of Fig 4, and viewed as indicated by the arrows; Fig. 6, an enlarged broken sectional plan view taken on line 6 of Fig. 4 and showing only part of the blank-feeding mechanism, tacking-device support, and staple-wire feeders; Fig. 7, an enlarged detail view of the driving mechanism for the feed-chains; Fig. 8, a broken plan section taken on the irregular line 8 8 in Fig. 7; Fig. 9, a section taken on line 9 of Fig. 8 and showing a detail of the construction of clutch mechanism; Fig. 10, a broken sectional view taken on line 10 of Fig. 8 in the direction of the arrow and showing details of construction of the tacking-device-support-oscillating mechanism; Fig. 11, a broken detail view in the nature of a section taken on line 11 of Fig. 6, viewed in the direction of the arrow and showing a box-blank in cross-section; Fig. 12, a broken sectional view of details connected with the nail-feeding mechanism; the section being enlarged and taken on line 12 of Fig. 4 in the direction of the arrow; Fig. 13, an enlarged broken section taken on line 13 of Fig. 3 and viewed in the direction of the arrow, illustrating the blank-feeding mechanism; Fig. 14, a top or outer plan view of a completed box-blank; Fig. 15, a cross-section of the blank, taken on line 15 of Fig. 14; Fig. 16, an enlarged vertical section of parts of an oscillating frame which carries the tacking devices and showing one of the tacking devices in side elevation, and Fig. 17 a broken view showing the lower forward end of a stapling device and the shaft which severs the strengthening-wire.

The main frame of the machine consists of a right-hand cheek A, mounted upon legs $t$ $t$, a left-hand cheek A', mounted upon legs $t'$ $t'$, a frame consisting of a right-hand bar $A^2$, a left-hand bar $A^3$, joined at the front and rear ends by cross-bars, (not shown,) the said side bars being set into the inner faces of the cheeks, as indicated in Figs. 3 and 4, to be supported thereby at their rear ends and provided at their forward ends with legs $t^2$. Intermediate of the said end bars is a cross-bar $A^4$, (see Fig. 4,) extending between the cheeks A A' above their forward legs to be out of the way of wheels and drive-chains.

B B are sheet and cleat guides mounted at opposite ends upon crosswise-extending bars $A^5$, (see Figs. 11 and 13,) which are suitably supported at opposite ends by the side bars $A^2$ $A^3$. The guides B B are adjustably fastened upon the bars $A^5$ by means of bolts and thumb-nuts $s$ $s$, which pass through longitudinally-extending slots in the bar $A^5$, the said slots extending, say, from the points $x$ to the points $x'$ at opposite end portions of the bar $A^5$, as indicated in Fig. 11. The guides B have overlapping edges $s'$ $s'$ to receive the edges of the sheet Y' of the blank Y, as shown in Fig. 11, the cleats $Y^2$ resting on guide-bars B' underneath the overlapping edges $s'$. The bars B' are provided with downward-extending bolts $s^2$, which extend through the slots in the bars $A^5$, being fastened in place by means of thumb-nuts $s^3$. Surrounding the bolts $s^2$ are springs $s^4$, which tend to hold up the bars B' and render them slightly yielding in the downward direction.

The object of having the bars B' yielding is to prevent binding of the cleats and sheet as they pass through the guides, particularly when, as frequently happens, they vary in size.

In practice the front ends of the bars B' (broken away in Fig. 13) are left slightly lower than the rear ends the more readily to permit a new blank to be introduced. If desired, the upper front edges of the bars may be rounded somewhat, though I have found the expedient first mentioned sufficient in practical operation.

C is the main operating-shaft of the machine, journaled at opposite ends in the upper ends of the cheeks A A' and provided beyond the cheek A' with a belt-pulley C', which in practice is belted to a line-shaft or other suitable power. The pulley C' rotates constantly, and between the said pulley and shaft C is clutch mechanism $r$, which may be of the same construction as the clutch mechanism in the same position of the machine shown in my aforesaid patent. The said clutch mechanism is actuated by a rod $C^2$, passing near its upper end through a guide-sleeve $r'$ on the cheek A' (see Fig. 2) and fitting at its lower end in a guide-block $r^2$ on the floor. It will suffice to say in the present connection that movement of the rod $C^2$ in the downward direction causes the clutch $r$ to produce engagement between the pulley C' and shaft C, whereby the latter rotates, and rise of the rod $C^2$ operates the clutch $r$ to release engagement between the said pulley and shaft, whereby the shaft ceases to rotate.

It may be added for ease of understanding that the clutch is spring-actuated to cause engagement between shaft and pulley and that the function of the rod $C^2$ when raised is simply to engage a suitable projection (not shown) on the clutch, and thereby overcome the force of the spring and disengage the clutch members. When the rod is lowered, the spring is left free to act and throw the clutch members into engagement again.

Journaled toward opposite ends in the main frame, near the front and rear ends of the latter, are cross-shafts D and E. On the shaft D, between the side bars $A^2$ $A^3$, is a pair of laterally-adjustable sprocket-wheels D', and on the shaft E is a similar pair of laterally-adjustable sprocket-wheels E'. Extending over the sprocket-wheels D' E' are feed-chains F, each provided with two similarly-located projecting blank-engaging feed-lugs F'. (See Figs. 2, 11, and 13.)

As in the former machine, when the blank material is first placed in the machine it is advanced quickly forward to the tacking devices by means of preliminary feed mechanism and is then released from the preliminary feed mechanism and advanced at a slower and predetermined rate of speed beneath the tacking devices.

The preliminary feed mechanism of the present machine will be first described.

G is a shaft journaled in a bearing on the side cheek A and carrying a pulley G', which in practice is belted to a line-shaft or other suitable power to rotate constantly. On the shaft G is a sprocket-wheel $G^2$. Fulcrumed upon the shaft G is a bell-crank lever $G^3$, having the arms $G^4$ and $G^5$. (See Fig. 1.) Journaled upon the free end portion of the arm $G^5$ is a friction-wheel $G^6$ and a sprocket-wheel $G^7$, the sprocket-wheel $G^7$ being geared to the sprocket-wheel $G^2$ by means of a drive-chain $G^8$. On the shaft D is a friction drum or pulley $D^2$. The friction-wheel $G^6$ may be swung into engagement with the friction-pulley $D^2$, but is held normally out of contact therewith by means of a spring $G^9$, (see Fig.

1,) fastened at one end to a lug $t^3$ on the cheek A and at its other end to the arm $G^5$ of the bell-crank lever.

Extending across the machine and journaled in the cheeks A A' is a rock-shaft $G^{10}$, upon which, beyond the cheek A', is fastened a lever $G^{11}$. Beyond the cheek A the shaft $G^{10}$ carries a dog $G^{12}$ in position to engage the arm $G^4$ of the bell-crank lever. In Fig 3 the shaft $G^{10}$ is shown to be bent upward between the cheeks, and this is merely done for the purpose of raising it between its ends above the path of the box-blanks.

When the blank material is first placed in the guides B, the operator presses down the lever $G^{11}$ to rock the shaft $G^{10}$ and turn the dog $G^{12}$ against the arm $G^4$ of the bell-crank lever, whereby the latter is swung against the resistance of the spring $G^9$ to press the friction-wheel $G^6$ against the friction-pulley $D^2$. As before stated, the pulley $G'$ revolves constantly, and through the drive-chain connection with the friction-wheel $G^6$ rotates the latter constantly, so that when the lever $G^{11}$ is pressed down to bring about engagement between the friction-wheel $G^6$ and pulley $D^2$ the shaft D, its sprocket-wheels $D'$, and the drive-chains F are moved at comparatively great speed to cause the lugs $F'$ to engage the rear ends of the blanks and push them forward to the tacking devices. On the lever $G^{11}$, just beyond the shaft $G^{10}$, is a downward-extending swinging finger $G^{13}$, and on the side of the cheek A' is a lug or shelf $t^4$. When the lever $G^{11}$ is depressed, as stated, the finger $G^{13}$ is raised and drawn by a spring $G^{14}$ to rest upon the shelf $t^4$, and thus hold the friction-wheel $G^6$ in engagement with the friction-pulley $D^2$ against the resistance of the spring $G^9$.

When the blank material has been advanced to the tacking devices, the preliminary feed mechanism is stopped, as hereinafter described.

H is a shaft extending across the machine and journaled in the cheeks in the positions shown in Figs. 1 and 2. Between the cheeks the shaft H carries a sprocket-wheel $H'$, (see Fig. 8,) and on the shaft D is a sprocket-wheel $D^3$, the sprocket-wheels $H' D^3$ being geared together by means of a drive-chain $H^2$. The sprocket-wheel $H'$ is three times the size of $D^3$, the sprocket-wheel $D^3$, whereby in the rotation of the shaft D the shaft H is driven at one-third the speed of the former. The parts are so constructed with relation to each other that the shaft H will be given one complete revolution in the time that the drive-chains F move the distance of one-half of their lengths. On the shaft H, beyond the cheek A', is a disk or wheel $H^3$. (See, for example, Figs. 2 and 8.) On the inner and outer sides of the disk $H^3$ are annular T-grooves $q q'$, respectively. Adjustably fastened in the T-groove $q$ is a projection or roller $q^2$. The roller $q^2$ is upon a bolt $q^3$, having a head which fits the T-groove. The bolt with the roller may be slid to any position around the T-groove $q$ and fastened in adjusted position by means of a nut $q^4$. The finger $G^{13}$ on the lever $G^{11}$, before described, is in the path of the roller $q^2$, and the latter is so positioned upon the disk $H^3$ that it will engage the finger $G^{13}$ and slide it off the shelf $t^4$ when the forward edge of the blank material arrives at the tacking devices. Thus, as before described, the friction-wheel $G^6$ will be disengaged by the spring $G^9$ from the friction-pulley $D^3$ and stop the preliminary feed.

I (see particularly Figs. 2, 5, and 8 to 10, inclusive) is a comparatively short shaft journaled between its ends in a bearing in the cheek A' and side bar $A^3$. On the shaft I, at the outer side of the cheek, is a sprocket-wheel $I'$ geared, by means of a drive-chain $I^2$, to a sprocket-wheel $C^3$ on the drive-shaft C. Thus in the rotation of the shaft C the shaft I will be rotated. Near the inner end of the shaft I and keyed thereto is a pinion $I^3$.

K is a pin or stationary shaft fastened to the side bar $A^3$ and projecting inward just below the shaft I. On the shaft or pin K is a sleeve $K'$, carrying a gear-wheel $K^2$, which meshes with the pinion $I^3$ and a pinion $K^3$, which meshes with a gear-wheel $D^4$ on the shaft D. Thus in the rotation of the shaft I the pinion $I^3$ rotates and turns the gear-wheel $K^2$ and pinion $K^3$ to turn the gear-wheel $D^4$ and shaft D. On the side of the gear-wheel $D^4$ is a ratchet-wheel $D^5$. The ratchet-wheel is keyed to the shaft D, while the gear-wheel $D^4$ is loose upon the shaft. Mounted upon one of the spokes of the gear-wheel $D^4$ is a pawl $D^6$, which in the rotation of the gear-wheel engages the ratchet and turns the shaft. When, however, the shaft D is turned from the friction-pulley $D^2$, as before described, the ratchet moves beneath the pawl $E^6$, so that the motion of the shaft D is not conveyed to the shaft I and through the latter to the shaft C.

Hung from the shaft C and loosely fastened thereto at its lower end is an oscillating or swinging frame or movable support L, consisting of parallel downward-extending bars $L' L'$, formed with the sleeves $L^2 L^2$, which surround the shaft, and a cross-bar or brace $L^3$. (Shown, for example, by dotted lines in Fig. 5.) The inner end of the shaft I is reduced, as shown in Figs. 8 and 10, and surrounded by a loose sleeve $p$, carrying a crank-arm $p'$. The sleeve $p$ is fastened normally to the shaft I, to revolve therewith, by means of clutch mechanism hereinafter described. On the crank is a crank-pin $p^2$. A link $p^3$ is pivotally connected at one end to the crank-pin $p^2$ and at its opposite end is pivotally connected to the lower end portion of one of the side bars $L'$ of the swinging frame L. Thus when the sleeve $p$ and crank-arm are clutched to the shaft I the rotation of the shaft I causes the swinging frame L to be swung or oscillated back and forth on the pivot formed by the shaft C.

Mounted upon a cross-bar L⁴, forming a part of the swinging frame L, are two staple forming and driving devices M M of the construction shown and claimed by me in my aforesaid pending application. As in my former construction, I provide a vertically-sliding cross-head M' for operating the driving-plungers of the stapling devices. This cross-head M' is actuated from eccentrics M² on the shaft C through the medium of connecting-rods M³. I also employ a cross-head M⁴ for operating the staple-formers, the same as in my aforesaid patent, the cross-heads M⁴ being operated by eccentrics M⁵ M⁵ on the shaft C through the medium of the connecting-rods M⁶. It is to be understood that the staple forming and driving devices, with their operating cross-heads M' M⁴, are on and oscillate with the swinging frame L. It will suffice to say in the present connection that the movement of the cross-heads M' M⁴ is the same as in the machine shown in my aforesaid patent, whereby staples are formed and driven out of the lower ends of the devices M in each revolution of the shaft C when staple-wire is fed thereto.

The manner of feeding stapling-wires to the staple forming and driving devices in the present machine differs from the mechanism for the purpose shown in my aforesaid patent, and therefore will be described in detail. This mechanism is shown most plainly in Fig. 6. Extending across the rear end portion of the machine is a shelf N, broken away in Fig. 6 to avoid hiding the sprocket-wheels D'. In Fig. 6 only one staple-wire-feeding device is shown complete, the other being partly broken away, the construction thereof being similar to the construction of the one shown. On the shelf N for each stapling device is a wire-carrying spool N'. Fastened against the bar L⁴ are arms N², just at the lower end portions of the staplers M, as shown in Fig. 4. These arms move with the frame L between the positions shown by full and dotted lines. On the outer end of each arm N² is a wire-engaging feed-pawl N³. Sliding upon the arm N² is a sleeve N⁴, carrying a wire-engaging pawl N⁵. The sleeve N⁴ is pivotally connected to the end of a rod N⁶, which at its opposite end is pivotally connected to a pin N⁷ on the shelf N. The wires Z, from which the staples are formed, extend from the spools N' beneath the pawls N³ N⁵ to the stapling devices M. In the movement of the frame L from the position shown in full lines in Fig. 6 to the position shown by dotted lines in that figure the pawls N³ grip the wires Z and draw them from the spools. In the movement of the frame L from the position shown in dotted lines to the position shown in full lines the wires are held by the pawls N⁵ and the pawls N³ slide over the wires. Thus in this movement the stapling devices slide over the ends of the wires, which are thus brought into position to be cut and formed into staples.

The strengthening-wires Z' pass between guide-rollers P P, mounted on shafts P' P². On the shafts P' P² are pinions P³ P⁴, respectively, which intermesh. Loosely mounted on the rock-shaft G¹⁰ is a pinion P⁵, which meshes with the pinion P⁴. Also loosely mounted on the rock-shaft G¹⁰ is a star-wheel P⁶. On the hub of the pinion P⁵ is a ratchet P⁷, and on the star-wheel is a pawl P⁸. The star-wheel extends into the path of a crank-arm H⁴, keyed to the shaft H. (See Figs. 3 and 5.)

When the first staples have been driven over the strengthening-wires to fasten them to the box-blank, the strengthening-wires will be drawn along by movement of the blanks. When a box is formed from a blank, the ends are fastened together by twisting or otherwise fastening together the ends of the strengthening-wires, which are caused to project beyond the ends of the blank for that purpose, as indicated in Fig. 14. Therefore it is necessary to feed the strengthening-wires forward a short distance before the first staples are driven to fasten them to the blank. This forward feeding of the strengthening-wires is brought about in the initial movement of the shaft H by the arm H⁴ engaging with the star-wheel P⁶ and turning it part of a revolution. In the turning of the star-wheel the pawl carried thereby engages and turns the ratchet P⁷ and pinion P⁵ to rotate the pinions P⁴ P³, and consequently the shafts P' P² and feed-wheels P. In the travel of the blank through the machine thereafter the wires are drawn between the feed-wheels P, the rotation of the shafts and gears P³, P⁴, and P⁵ causing no rotation of the star-wheel on account of the fact that the ratchet P⁷ will slide on the pawl P⁸.

The upper surface of the bar L⁵ of the frame L may form the anvil against which the staples are clenched.

On the lower end portion of each staple device M is a tubular backward-extending part M⁷, having a strengthening-wire-guiding opening $n'$ with a flaring mouth $n$ and affording a bearing for a cross-shaft R. (See Figs. 5 and 16.) The shaft R is journaled at opposite ends in the side bars L' of the swinging frame and is provided beyond one of said bars (see Fig. 5) with a crank R'. In the shaft are wire-cutting slots $n^2$, coincident with the openings $n$, and through which the strengthening-wires Z' pass. The slots $n^2$ are of a length sufficient to permit the lateral adjustment of the stapling devices according to the width of blank to be produced, and in practice the slots may be of substantially the same length as the slots in the bars A⁵, (see Fig. 11,) before described. In front of the shaft R the openings through the wire-guide projections M⁷ are but little larger in diameter than the strengthening-wires, and the openings of the slots $n^2$ at the forward edge of the shaft are reduced to the same size, so that wire-cutting edges or shears $n^3$ are produced. Normally the shaft R is in the position shown in Fig. 5, whereby the passage through the wire-guides $M^7$ is free, so that the wires can pass through unobstructed. The crank $R'$ is pivotally connected at its free end by means of a pin $R^2$ to a vertically-movable bar or lever $R^3$, having at its upper end a backward-extending lip or projection $R^4$. The pin $R^2$ forms a pivot upon which the bar or lever $R^3$ may swing, and the said bar or lever has a downward-extending arm carrying a roller $R^5$. A spring $R^6$, fastened at one end to a lug upon the side bar $L'$ and at its other end to the upper end portion of the bar or lever $R^3$, tends to hold the said bar or lever in the retracted position shown in Fig. 5. In the cross-head $M'$ is a groove $m$. Pivoted upon a pin $l$ at the side of the same bar $L'$ of the swinging frame is a lever $l'$, having an upward-extending arm, which bears against the roller $R^5$, and a downward-extending arm carrying a roller $l^2$ in the path of an arm $l^3$, fastened to the shaft H. In practice the arm $l^3$, which turns with the shaft H, engages the roller $l^2$ of the lever $l'$ just before the machine stops, and in so doing swings the lever $R^3$ so that the lip $R^4$ engages the groove or recess $m$ of the cross-head $M'$ while the latter is rising. Thus in the final upstroke of the cross-head the lever $R^3$ is drawn upward to turn the crank $R'$ and shaft R to cut off the wires $Z'$ just before the machine stops. The machine stops just as the arm $l^3$ passes beyond and disengages the roller $l^2$, whereby the lever $R^3$ is withdrawn by the spring $R^6$ from the slot $n$, and, descending by gravity, turns the cutting-shaft R to its normal position.

As before stated, as soon as a blank is completed the machine stops. This stoppage is performed by the following mechanism: Pivoted upon the cheek $A'$ at $k$ (see Fig. 2) is a bell-crank lever $k'$, pivotally connected at one of its arms to a pin $k^2$ on the rod $C^2$ and provided at the end of its other arm with a projection $k^3$. On the circumferential edge of the disk $H^3$ is a projecting cam $k^4$, into the path of which the projection $k^3$ of the bell-crank lever extends. A spring $k^5$, fastened at one end to the bell-crank lever and at its other end to a lug on the cheek $A'$, tends normally to hold the bell-crank lever against the circumferential surface of the disk $H^3$ and to draw the rod $C^2$ downward to the clutch-engaging position. The cam $k^4$ is so positioned upon the disk $H^3$ that it engages the bell-crank lever $k'$ and swings it to its clutch-releasing position just after a blank is completed and the strengthening-wires have been cut. On the block $r^2$ is a pawl $i$, connected by a rod $i'$ with a bell-crank lever $i^2$, pivoted upon a block $i^3$ on the floor. One arm of the bell-crank lever $i^2$ forms a treadle or foot-lever $i^4$. A spring $i^5$ tends to press the pawl $i$ against the rod $C^2$, whereby when it is raised to clutch-releasing position it engages a notch $i^6$ in said rod. After the blank material has been advanced by the preliminary feed, as before described, to the tacking devices the operator may start the operation of the machine by pressing down the foot-lever $i^4$ to release the rod $C^2$ and cause it to produce engagement of the clutch members between the shaft C and pulley $C'$, as before described.

It may be stated that when the machine is at rest after a blank has been completed the parts described are in the position shown in Fig. 2, whereby the cam $k^4$ will prevent swinging of the bell-crank lever $k'$ to start the machine until after the disk $H^3$ has been moved from that position by the operation of the preliminary feed.

In the drawings I have shown the machine provided with means for feeding and fastening a band or strip of metal $Z^2$ along the center of the blank instead of a strengthening-wire. In my former patent I showed a blank provided with a third strengthening-wire along the center, and the present machine is adapted to manufacture such a blank by providing a third stapling device M in place of the nailing mechanism shown. The nailing mechanism I provide is substantially of the form shown and described in Letters Patent No. 608,917, granted August 9, 1898, "Box nailing and printing machine"—that is to say, I have merely taken the idea therefrom of a nail supplier, feeder, positioner, and driver. For this reason the nailing mechanism, which is not specifically claimed in the present application, is not shown in detail. It will suffice to say that journaled in the cheeks A $A'$ is a rock-shaft S, provided beyond the cheek $A'$ with a crank $S'$, connected by means of a crank-rod $S^2$ with a crank $S^3$ on the end of the shaft D. Thus in the rotation of the shaft D the shaft S is rocked. Fastened upon the shaft S is a nail-reservoir $S^4$, from which extends a nail-guide $S^5$ to a flexible nail-feeding tube $S^6$, which extends to a nail-positioner $S^7$ upon the bar $L^4$ of the swinging frame. Mounted upon the bar $L^5$ of the swinging frame, just below the nail-positioner $S^7$, is a nail-clenching block $S^8$. The nail-driver or plunger, which works through the nail-positioner $S^7$, is fastened to the cross-head $M'$. $S^9$ is the nail-feeding valve, located between the nail-guide $S^5$ and feed-tube $S^6$, the construction being the same as in my aforesaid pending application. The valve $S^9$ reciprocates longitudinally in guides upon a brace-bar $A^6$, extending between the cheeks A $A'$. On the inner side of the cheek $A'$ is a bracket $f$, (see Fig. 12,) on which is fulcrumed a bell-crank lever $f'$, having an arm $f^2$, pivotally connected by means of a pin $f^3$ with the valve $S^9$, and having an arm provided with a socket $f^4$, which engages a knob or lug $f^5$ on the adjacent surface of the side bar $L'$ of the swinging frame L. As the frame L swings, the engagement of the knob $f^5$ with the lever $f'$ oscillates the latter, causing it to reciprocate the valve $S^9$ and thus feed one nail $Z^3$ at the proper time to the feed-tube $S^6$, which guides the nail to the nail-positioning device. Thus in each descent of the cross-head M' the nail-driver operates to drive a nail and the staple-drivers operate to drive staples. The band Z² is fed between rollers P⁹ on the shafts P', P², and the feeding is performed in the same way as the strengthening-wires Z'. The band passes through a slot $n^2$ in the rock-shaft R and is severed in the same way as the strengthening-wires are severed. The band Z² is preferably of thin metal or wood, and the nails are driven therethrough and through the sheet Y' and clenched on the under side.

If desired, nailing devices like the one shown may be provided instead of stapling devices, and my invention contemplates the use of staple-driving devices alone, nailers alone, or one or more of each, all being embraced in the term "tacking devices" employed in the claims.

When the blank Y has passed from the present machine, it is provided on its inner side with preferably step-miter cuts to permit the blank to be bent and produce the corners or edges of the box.

In order that no staples or nails may be driven at the points where the step-miter cuts are to be produced, I provide in the present machine skipper mechanism, which will be next described.

In the machine shown in my aforesaid Letters Patent, No. 608,796, and in the machines previously constructed for the manufacture of box-blanks the skipping has been produced by accelerating the feed of the blank through the machine at proper stated intervals. In the present machine the skipping is produced by withholding the driving of nails or staples at proper stated intervals, this withholding being produced by preventing the feed of staple-wire or nails to the tacking devices.

The oscillation of the frame L, which carries the tacking devices, is produced, as before described, by the shaft I turning the crank $p'$ on the sleeve $p$. In the shaft I, at one side, is a longitudinally-extending groove $d$, into which is fitted a rock-shaft $d'$, having a reduced end portion $d^2$ in the reduced end of the shaft I. On the shaft I and turning therewith is a collar $d^3$, provided in its side with an elongated recess $d^4$, through which projects a crank $d^5$, which is an integral part of the rock-shaft $d'$. The crank $d^5$ is held normally in position to project beyond the circumference of the collar by a spring $d^6$. When the crank projects beyond the circumferential face of the collar $d^3$, the rock-shaft $d'$ is turned axially to a position wherein its reduced end $d^2$ projects into a recess in the sleeve $p$, as indicated in Fig. 10. Thus the sleeve $p$ is clutched to the shaft I, whereby in the rotation of the shaft the swinging frame L is oscillated.

T is a bar beyond the side cheek A' of the machine, at one end surrounding the shaft H and at the opposite end surrounding the shaft I. On this bar is a sliding block T', held normally in the retracted position shown in Figs. 7 and 8 by a spring T², which spring is fastened at one end to a stud on the bar and on its opposite end to a stud on the sliding block. Adjustably fastened in the annular T-groove $q'$ of the disk H³ are four cam projections T³, which in the rotation of the disk H³ engage the end of the block T' and slide it longitudinally against the surface of the collar $d^3$ into the path of the crank-arm $d^5$ on the clutch or rock shaft $d'$. Thus each time a cam T³ engages and moves the sliding block T' it moves the block against the collar $d^3$ and into the path of the crank-arm $d^5$, thereby causing the clutch or rock shaft $d'$ to be turned against the resistance of the spring $d^6$ and release the sleeve $p$, whereby for one revolution of the shaft I the swinging frame L remains stationary. Each time the said frame remains stationary it fails to produce the feed of stapling-wire for one staple and fails to produce the feed of one nail to the nail positioning and driving devices. Therefore in the downward plunge of the nail and staple drivers no nails or staples will be in position for discharge and the proper spaces on the blank will be skipped in the sense that no nails or staples will there be driven. For blanks of different lengths to produce boxes of different sizes the cams T³ may be adjusted as desired.

It will be understood from the foregoing description that the present machine is for the manufacture of box-blanks comprising, more especially, a sheet, which may be one or a number of adjacent abutting pieces and cleats, all of which are advanced through the sheet and cleat-guides B and reinforced with strips, which may be strengthening wires or bands of metal or other suitable material. The strips, sheet, and cleats are secured together by means of fasteners, which may be staples, nails, or the like. The tacking devices, which drive the fasteners, are upon a frame or support which oscillates, in the sense that it moves in the forward direction before each tacking operation, and during each tacking or fastener-driving operation it moves in the backward direction at approximately the same speed as the blank into which the fasteners are being driven. If strengthening-strips in the form of wires are to be used for strengthening the box-blank, two, three, or more staple devices are placed upon the oscillating frame or support and the proper number of wire-feed rollers, wire-supplying reels, and accompanying mechanism described placed in position. If strengthening-strips in the form of bands are to be provided upon the blank, the desired number of tacking devices in the form of nailers are placed in the machine with the accompanying band-feeding devices. The sheet and cleat guides B may be adjusted toward and away from each other to guide blank material of any desired width, and the tacking devices may be placed upon their supports in the proper position to work upon the blank. The feed-chains F and their sprocket-wheels may be adjusted laterally to be in proper position for engaging the sheet and cleats. The various adjustments may be effected very quickly, so that little time will be required to change the machine over for the manufacture of any style or size of blank. In the event that it is desired to form blanks with the sheets and strengthening-strips without the reinforcing-cleats it will only be necessary to raise the guide-bars B' and provide a clencher like the clencher $s^8$ beneath each of the tacking devices employed. In the event that it should be desired at any time to manufacture blanks without the strengthening-strips this may be done by leaving off the means for supplying the strengthening-strips.

While I prefer to construct my improvements throughout as shown and described, it is obvious that they may be modified in the matter of details of construction without departing from the spirit of my invention as defined by the claims.

What I claim as new, and desire to secure by Letters Patent, is—

1. In a machine for fastening a strengthening-strip to a sheet, the combination of feed mechanism for advancing the sheet and strengthening-strip longitudinally through the machine, a movable support, a tacking device on the support adjacent to the path of the strengthening-strip, means for actuating the tacking device to drive fasteners, and means for moving the tacking device with the strip and sheet while the fasteners are being driven, substantially as and for the purpose set forth.

2. In a machine for fastening a strengthening-strip to a sheet, the combination of feed mechanism for advancing the sheet and strip longitudinally through the machine, a movable support, a tacking device on the support adjacent to the path of the strip, means for actuating the tacking device to drive fasteners, means for moving the tacking device with the strip and sheet while the fasteners are being driven, and fastener-supplying mechanism for the tacking device operated by said movement of the tacking device, substantially as and for the purpose set forth.

3. In a machine for fastening a strengthening-strip to a sheet, the combination of feed mechanism for advancing the sheet and strip longitudinally through the machine, a movable support, a tacking device on the support adjacent to the path of the strip, means for actuating the tacking device to drive fasteners, means for moving the tacking device with the strip and sheet while the fasteners are being driven, fastener-supplying mechanism for the tacking device operated by said movement of the tacking device, and skipper mechanism operating, relative to the feed mechanism, to withhold movement of the tacking device at stated intervals, whereby no fasteners will be driven thereby, substantially as and for the purpose set forth.

4. In a machine for fastening a sheet to a cleat, the combination of feed mechanism for advancing the sheet and cleat longitudinally through the machine, a movable support, a tacking device on the support adjacent to the path of the sheet, means for actuating the tacking device to drive fasteners, and means for moving the tacking device with the sheet and cleat while the fasteners are being driven, substantially as and for the purpose set forth.

5. In a machine for fastening a sheet to a cleat, the combination of feed mechanism for advancing the sheet and cleat longitudinally through the machine, a movable support, a tacking device on the support adjacent to the path of the sheet, means for actuating the tacking device to drive fasteners, means for moving the tacking device with the sheet and cleat while the fasteners are being driven, and fastener-supplying mechanism for the tacking device operated by said movement of the tacking device, substantially as and for the purpose set forth.

6. In a machine for fastening a sheet to a cleat, the combination of feed mechanism for advancing the sheet and cleat longitudinally through the machine, a movable support, a tacking device on the support adjacent to the path of the sheet, means for actuating the tacking device to drive fasteners, means for moving the tacking device with the sheet and cleat while the fasteners are being driven, fastener-supplying mechanism for the tacking device operated by said movement of the tacking device, and skipper mechanism operating, relative to the feed mechanism, to withhold movement of the tacking device at stated intervals, whereby no fasteners will be driven thereby, substantially as and for the purpose set forth.

7. In a machine for forming box-blanks, by fastening sheets and strengthening-strips to reinforcing-cleats, the combination of guides for the cleats, feed mechanism for advancing the cleats longitudinally in their guides and with a sheet through the machine, a movable support, tacking devices upon the support, means for moving the support back and forth adjacent to the path of the blanks, whereby it moves in the backward direction at approximately the speed of the blank in the operation of the tacking devices, and means for feeding strengthening-strips with the blank material across the tacking devices, substantially as and for the purpose set forth.

8. In a machine for forming box-blanks, by fastening sheets and strengthening-strips to reinforcing-cleats, the combination of guides for the cleats, feed mechanism for advancing the cleats longitudinally in their guides and with a sheet through the machine, a movable support, tacking devices upon the support, means for moving the support back and forth adjacent to the path of the blanks, whereby it moves in the backward direction at approximately the speed of the blank in the operation of the tacking devices, means for feeding strengthening-strips with the blank material across the tacking devices, and fastener-supplying mechanisms for the tacking devices operated by said movement of the tacking devices, substantially as and for the purpose set forth.

9. In a machine for forming box-blanks, by fastening sheets and strengthening-strips to reinforcing-cleats, the combination of guides for the cleats, feed mechanism for advancing the cleats longitudinally in their guides and with a sheet through the machine, a movable support, tacking devices upon the support, means for moving the support back and forth adjacent to the path of the blanks, whereby it moves in the backward direction at approximately the speed of the blank in the operation of the tacking devices, means for feeding strengthening-strips with the blank material across the tacking devices, and skipper mechanism operating, relative to the feed mechanism, to withhold movement of the tacking devices at stated intervals, whereby no fasteners will be driven thereby, substantially as and for the purpose set forth.

10. In a machine for forming box-blanks, the combination with the feed mechanism for the blank material, of an oscillating support, fastener-driving tacking devices on the support adjacent to the path of the blank material, and means for moving the support on its pivot in the backward direction at approximately the speed of travel of the blank material while fasteners are being driven, substantially as and for the purpose set forth.

11. In a machine for forming box-blanks, the combination with the feed mechanism for the blank material, of a pivotally-mounted support, fastener-driving tacking devices on the support adjacent to the path of the blank material, means for moving the support on its pivot in the backward direction at approximately the speed of travel of the blank material while fasteners are being driven, and skipper mechanism operating at predetermined intervals in the passage of the blank material to withhold movement of the said support, thereby to prevent feeding of fasteners to the driving mechanism, substantially as and for the purpose set forth.

12. In a machine for forming box-blanks, the combination with the drive-shaft, of feed-belts for engaging and moving the blank material through the machine geared to the drive-shaft, preliminary feed-operating mechanism comprising gear mechanism which may be thrown at will into operative engagement with the feed-belts to advance the blank material into the machine, and adjustable preliminary feed-disengaging mechanism actuated by the advance of the feed-belts to a predetermined position in the machine, substantially as and for the purpose set forth.

13. In a machine for forming box-blanks, the combination with the drive-shaft and feed for the blank material, of a movable support adjacent to the path of the blank material actuated from the drive-shaft to move back and forth and in its movement in the backward direction to travel at approximately the speed of the blank material, a cross-head on the support geared to the said drive-shaft, and a fastener-driving tacking device on the support connected to the said cross-head, substantially as and for the purpose set forth.

14. In a machine for forming box-blanks, the combination with the drive-shaft, of feed-chains for the blank material, feed-chain-driving shafts geared to the said drive-shaft, a support adjacent to the path of the blank material geared to one of the belt-driving shafts to be oscillated thereby, clutch mechanism between the said support and feed-belt-driving shaft, whereby movement of the support may be started and stopped, a fastener-driving tacking device on the support actuated from the drive-shaft to drive fasteners into the blank material in the movement of the support in the backward direction, and skipper mechanism operating, relative to the feed-belts to produce engagement and disengagement of said clutch at predetermined intervals, substantially as and for the purpose set forth.

15. In a machine for forming box-blanks, the combination with the drive-shaft and feed for the blank material, of a movable support actuated from the drive-shaft to move back and forth, and in its movement in the backward direction to travel at approximately the speed of the blank material, a staple forming and driving device on the support operating in the movement thereof in the backward direction to drive staples into the blank material, a staple-wire supplier, the staple-wire being moved into the device by the movement of the device in the forward direction, substantially as and for the purpose set forth.

16. In a machine for forming box-blanks, the combination with the drive-shaft and feed for the blank material, of a movable support actuated from the drive-shaft to move back and forth, and in its movement in the backward direction to travel at approximately the speed of the blank material, a nail-driving device on the support operating in the movement thereof in the backward direction to drive nails into the blank material, and a nail-supplier, the nails being fed to the device by the movement of the support in the forward direction, substantially as and for the purpose set forth.

17. In a machine for forming box-blanks, the combination with the drive-shaft and feed for the blank material, of a movable support actuated from the drive-shaft to move back and forth, and in its movement in the backward direction to travel at approximately the speed of the blank material, a nail-driving device on the support operating in the movement thereof in the backward direction to drive nails into the blank material, a nail-supplier, the nails being fed to the device by the movement of the support in the forward direction, and a nail-clencher on the support, substantially as and for the purpose set forth.

18. In a machine for forming box-blanks, the combination with the main frame, of the movable support L, staple forming and driving device M on the support, arm $N^2$ movable with the support, staple-wire supplier $N'$, pivotal connection $N^6$, sliding block $N^4$, pawl $N^5$ on the sliding block and pawl $N^3$ on the arm $N^2$, all constructed and arranged to operate substantially as and for the purpose set forth.

19. In a machine for forming blanks by tacking a sheet and strengthening-strips to reinforcing-cleats, the combination of guides for the cleats, feed mechanism for advancing the cleats longitudinally in their guides and with a sheet and strengthening-strips through the machine, a fastener-driving device adjacent to the path of each strengthening-strip, operating to fasten the strip and sheet, by successive operations, to the cleats, means for guiding the strengthening-strips with the sheet and cleats across the fastener-driving devices, and relative skipping means actuated by the said feed mechanism, and operating, at predetermined intervals, in the passage of the sheet and cleats through the machine, to prevent a single fastener-driving operation of the fastener-driving devices, and thereby produce an increase of the distance between points of tacking, substantially as described.

20. In a machine for forming box-blanks, the combination with the drive-shaft and feed for the blank material, of the rotating shafts I H, swinging frame L eccentrically geared to the shaft I, clutch on the shaft I for gripping and releasing the eccentric gear, disk $H^3$, cams $T^3$ adjustably mounted on the disk, and a sliding clutch engaging and releasing block at the shaft I in the path of said cams, all constructed to operate substantially as and for the purpose set forth.

FREDERICK P. ROSBACK.

In presence of—
M. J. FROST,
R. T. SPENCER.